United States Patent [19]
Leu

[11] Patent Number: 5,213,125
[45] Date of Patent: May 25, 1993

[54] VALVE PLATE WITH A RECESSED VALVE ASSEMBLY

[75] Inventor: Shawn A. Leu, Sheboygan, Wis.

[73] Assignee: Thomas Industries Inc., Sheboygan, Wis.

[21] Appl. No.: 889,254

[22] Filed: May 28, 1992

[51] Int. Cl.⁵ ............................................. F16K 15/16
[52] U.S. Cl. ................... 137/15; 137/512.15; 137/856; 417/571
[58] Field of Search ............. 137/512.1, 512.15, 512.4, 137/856, 15; 417/569, 571

[56]  References Cited

U.S. PATENT DOCUMENTS

| Re. 32,651 | 4/1988 | Romer | 137/856 |
|---|---|---|---|
| 771,327 | 10/1904 | Schmidt | 137/512.15 |
| 1,276,478 | 8/1918 | Bechtold | 137/512.4 |
| 1,634,949 | 7/1927 | Valley | 137/512.15 |
| 1,669,889 | 5/1928 | Andrews et al. | 137/856 |
| 1,679,012 | 7/1928 | Wilson | 137/856 |
| 1,780,121 | 10/1930 | Dunning | 137/512.15 X |
| 2,021,085 | 11/1935 | Orr | 137/856 |
| 2,160,401 | 5/1939 | Engelman | 137/512.15 X |
| 2,417,246 | 3/1947 | Ferguson | 137/856 |
| 2,682,280 | 6/1954 | Nicklas | 137/512.15 |
| 2,908,287 | 10/1959 | Augustin | 137/856 |
| 3,241,748 | 3/1966 | Cramer et al. | 137/512.15 |
| 3,370,786 | 2/1968 | Brown | 417/571 |
| 3,998,571 | 12/1976 | Falke | 417/569 |
| 4,065,237 | 12/1977 | Webb | 417/571 X |
| 4,524,806 | 6/1985 | Romer | 137/856 |
| 4,565,507 | 1/1986 | Reimers | 137/512.15 X |
| 4,633,825 | 1/1987 | Flaig | 123/73 V |
| 4,867,650 | 9/1989 | Ikeda et al. | 417/269 |
| 4,955,797 | 9/1990 | Cowen | 137/856 X |
| 4,978,285 | 12/1990 | DaCosta | 417/569 |
| 5,016,669 | 5/1991 | Jamieson | 137/856 X |

FOREIGN PATENT DOCUMENTS 650642  9/1949  United Kingdom .

Primary Examiner—John Rivell
Attorney, Agent, or Firm—Hill, Steadman & Simpson

[57] ABSTRACT

A valve plate assembly includes a flapper valve and restraint in recessed intake and outlet ports of a valve plate. The recessed ports have guides located therein corresponding to notched sections of the flapper valve and the restraint such that a foolproof method of assembly can be achieved. In addition, a screw clearance in the top of the piston is not required since the recessed portion allows for the screw to be at or below the surface of the valve plate.

13 Claims, 1 Drawing Sheet

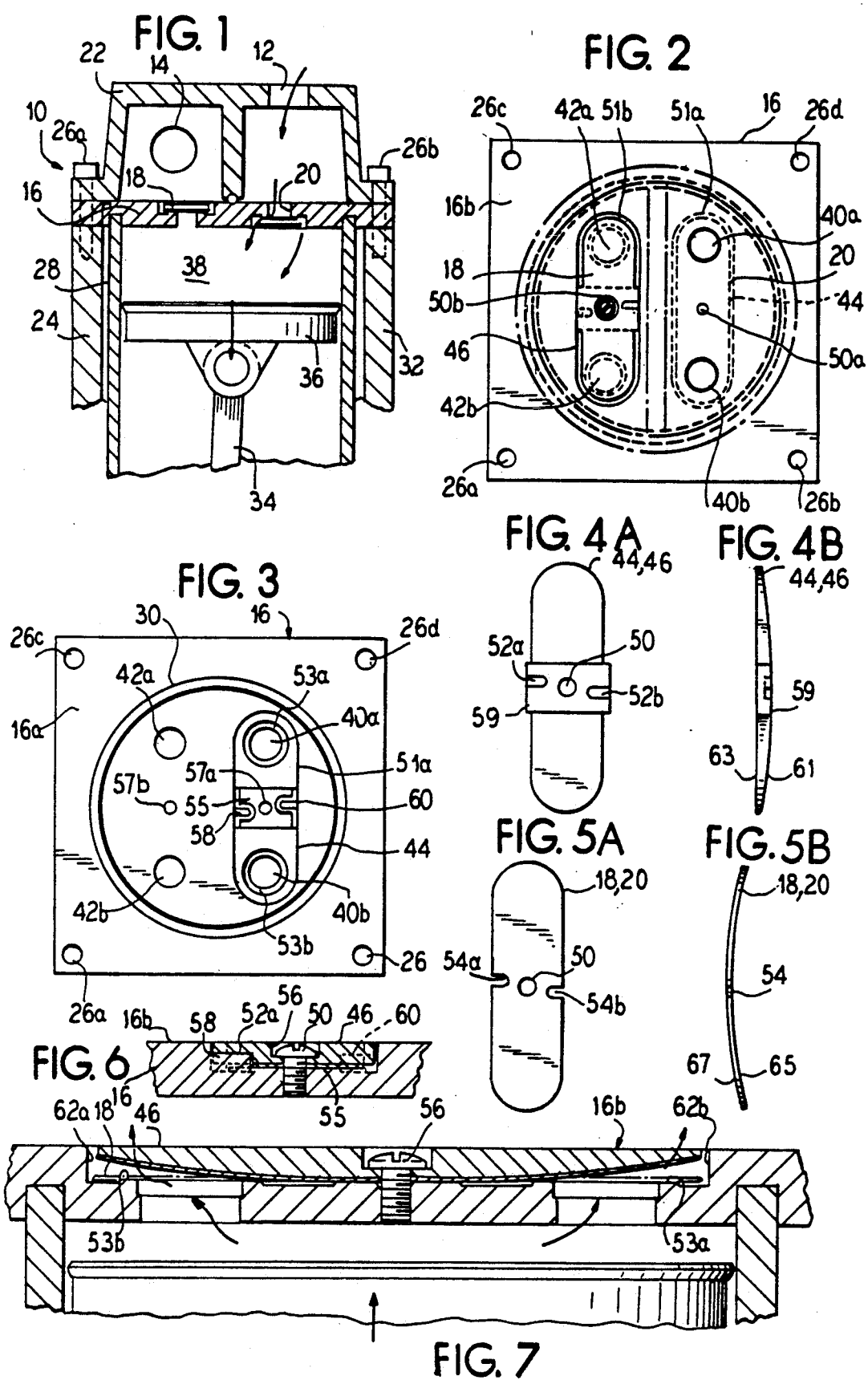

VALVE PLATE WITH A RECESSED VALVE ASSEMBLY

BACKGROUND OF THE INVENTION

The present invention relates generally to a valve assembly and more particularly to a flapper valve assembly in a valve plate for a piston compressor.

Typically, a valve plate is attached to a compressor cylinder block and has intake and discharge ports to the cylinder. The intake valve is mounted on the underside of the valve plate while the discharge valve is located on the top surface of the valve plate.

Typically, reed valves are used to regulate intake and discharge port openings in alternative fashion where each port requires a separate valve. The reed valves themselves are generally made of thin, resilient metal leaves and are held in place in a cantilever fashion by rivets, small screws, or by other suitable clamping means.

A reed valve assembly is known in U.S. Pat. No. 4,437,490 in which the reed valve arrangement has a base formed by two rigid members between which an intermediate portion of the reed is sandwiched. One of the rigid members has a downstream facing seat for the intake port, while the other of the rigid members has a downstream facing seat for the discharge port. This arrangement allows for a single reed to be utilized wherein one free end thereof acts as an intake valve member, while the other free end serves as a discharge valve member.

Material requirements for the above-mentioned arrangement are extensive since two valve plates are used with the reed member sandwiched between the two base members. The recesses of the base member must then be manufactured in complimentary fashion in order for the need to flex freely within the recess.

SUMMARY OF THE INVENTION

The present invention limits the motion of a flapper valve within a recess of a valve plate by providing a valve plate using a valve-flapper and a valve restraint of substantially the same two-dimensional shape as the valve-flapper mounted in a recess of the valve plate.

The valve restraint prevents the flapper valve from moving outside the recess so that it does not hit, for example, a piston in a compressor cylinder. The restraint also provides better valve efficiency and lowers the stresses on the flapper valve. The recess in the valve plate according to the present invention provides for an error proof assembly of the flapper valve and the restraint in the valve plate. It is thereby insured that the flapper has its inherently curved surface pressed against the valve plate.

Guides are provided in the recess to eliminate the need for additional fixtures to position the flapper valve and valve restraint over the port in the valve plate. Furthermore, recessed intake ports eliminate the need for a screw clearance recess in the piston top and also allow any 90 degree orientation of the valve plate and head.

In addition, the exhaust recess reduces clearance volume to offset the increase caused by the intake recess. The exhaust recess allows for the addition of sound-reducing/filtering material or baffles in the head without interfering with the valve movement and sealing.

BRIEF DESCRIPTION OF THE DRAWINGS

FIG. 1 is a partial sectional view through a cylinder of a piston compressor showing a valve plate and valve assemblies of the present invention;

FIG. 2 is a plan view of a valve plate and the flapper valves and valve restraints assembled in recesses in the valve plate according to the present invention including showing reverse side features thereof in phantom;

FIG. 3 is a bottom plan and elevational views of the valve plate shown in FIG. 2;

FIGS. 4A and 4B are bottom plan and elevational views, respectfully, of the valve restraint of the present invention;

FIGS. 5A and 5B are plan and elevational views, respectfully, of the flapper valve of the present invention;

FIG. 6 is an enlarged sectional view of the recessed intake ports eliminating the need for a screw clearance recess; and FIG. 7 is an enlarged sectional view of the flapper valve and valve restraint within the recessed portion of the valve plate of the present invention.

DESCRIPTION OF THE PREFERRED EMBODIMENTS

FIG. 1 shows a piston-type compressor generally at 10. The compressor 10 includes at the top an intake port 12 in a manifold 22 into which air or other gases to be compressed is drawn. An outlet port 14 in the manifold 22 passes therefrom air or other gases compressed by the compressor 10.

The flow of air is controlled by a valve plate assembly 16 comprising an outlet valve 18 and an inlet valve 20. The outlet valve 18 and the inlet valve 20 are flapper valves according to the present invention. The manifold 22 and the valve plate 16 are secured together onto a block 24 by appropriate fasteners, such as a plurality of screws 26a and 26b.

The block 24 serves as a superstructure and holds an end of a cylinder 28 tightly within the interior of a circular groove 30 formed into a lower surface 16a of the valve plate 16. The surface 16a is on a side of the valve plate 16 facing away from the manifold 22.

FIG. 1 further shows a rod 34 and a piston 36 as each functions within the compressor 10. The piston 36 is mounted for sliding movement within the interior of the cylinder 28. The valve plate 16, the cylinder 28 and the piston 36 form a generally enclosed volume 38 in which the gas is compressed. Although only a single piston cylinder is shown, it is of course contemplated that several such cylinders are included in an air compressor device. The general operation of the piston compressor 10 is described in U.S. Pat. No. 4,995,795, the disclosure of which is herein fully incorporated by reference.

FIG. 2 shows in greater detail an upper surface 16b of the valve plate assembly 16. Holes 40a and 40b formed through the valve plate 16 provide for passage of inlet air from the manifold 22 into the cylinder 28. The inlet valve 20 and inlet restraint 44 are shown in phantom below the holes 40a and 40b since they are positioned on the opposite side of the valve plate 16. Holes 42a and 42b permit the passage of compressed air out of the compressor 10 into the manifold 22. An outlet valve restraint 46 is secured above the outlet valve 18. It can be seen that the valves 18 and 20 are arranged symmetrically in the valve plate 16.

Both the inlet valve 20 and the outlet valve 18 are secured to the valve plate 16 sandwiches between the valve plate 16 and their respective inlet restraint 44 and outlet restraint 46, being held together by a screw 50a and 50b, respectively. Recesses 51a and 51b in the valve plate 16 allow for each component, the inlet valve 20 or the outlet valve 18, the inlet restraint 44 or the outlet restraint 46, and the inlet screw 50a or the outlet screw 50b to lie at or below the surface of the valve plate 16. The moving piston 36, thus, cannot strike the flapper valve, reducing risk of damage thereto and increasing its use life. Also, a screw clearance recess is not required in the top of the piston 36. The details of the valves 18 and 20 and the restraints 44 and 46 will be further described in conjunction with the figures in which they are represented.

FIG. 3 shows the lower surface 16a of the valve plate 16 with the inlet valve 20 and inlet restraint 44 removed to reveal the recess 51a. Two holes 40a and 40b extend through the valve plate 16 to permit passage of inlet air into the compressor cylinder. The holes 40a and 40b are in the recess 51a and are each surrounded by a raised lip 53a and 53b against which the flapper valve 20 seals when in the closed condition. Between the holes 40a and 40b is a valve mounting portion 55. As further illustrated in FIG. 3, guides 58 and 60 and a threaded mounting hole 51a are provided at the valve mounting portion of the recess 51a of the valve plate 16. The guides 58 and 60 are offset within the recess 51a such that slots 52a, 52b, 54a and 54b in the valve 20 and in the restraint 44 are placed directly onto the guides 58 and 60 in the recess provide for assembly in a foolproof manner.

Also visible on the valve plate 16 in FIG. 3 is the through-extending outlet holes 42a and 42b with a threaded valve mounting hole 57b therebetween. The outlet valve recess 51b is similar in structure to the inlet valve recess, including raised lips around the holes and a mounting portion with offset guides. The openings 26a through 26d through which the screws 26 extend are shown as well.

FIGS. 4a and 4b show the configuration of the inlet restraint or the outlet restraint 44 or 46, each being identical in construction. The restraints 44 or 46, unlike the valves 18 or 20, are made of a rigid material, generally a metal. In one embodiment, the restraint 44 is of a zinc alloy ZA-8. The restraints 44 or 46 limit the extent to which the valves 18 or 20 can flex. The slots 52a and 52b are offset to the same extent as the guides 58 and 60 and are aligned with the slots 54a and 54b of the valves 18 or 20 as shown in FIG. 5a. The slots 52a and 52b are in a central mounting portion 59 of the restraint 44 or 46, the mounting portion 59 being rectangular in shape and wider than the ends of the restraint. A central mounting hole 50 for the screw 50a or 50b is provided in the mounting portion 59.

FIG. 4B shows a side view of the restraint 44 or 46 with its curved lower surface 61 which limits the flexing of the flapper valve 18 or 20 after being fixed on the valve plate 16. The central mounting portion 59 is of a constant thickness and the lower surface 61 gradually curves toward an upper surface 63 so that the restraint 44 or 46 is increasingly thin at the ends. The top surface 63 is flat in the preferred embodiment. It can be seen that the slots 52a and 52b extend only part way through the mounting portion 59.

The flapper valve 18 or 20, each being identical, is shown in FIG. 5A and 5B. The flapper valve 18 or 20 is shaped to fit into the recess 51a or 51b in the valve plate 16 and has slots 54a and 54b which accept the guides 58 and 60 therein. A central hole 50 for the mounting screw 50a or 50b is also provided. As shown in FIG. 5B, the valve flapper 18 or 20 has an inherently concave surface 65 and an inherently convex surface 67. The slots 54a and 54b are arranged offset to insure that the concave surface 65 presses against lips 53 around the inlet and outlet holes 40 and 42. The slots 52a, 52b, 54a and 54b are placed on the guides 58 and 60 within the recess of the valve plate 16 as the apparatus is assembled. Since each of these slots 52a, 52b, 54a and 54b are offset in opposite directions from a centerline, a foolproof method is provided in assembly of the flapper valves 18 and 20 and the restraints 44 and 46. In particular, although the flapper valve and restraint may be turned end-to-end, it is not possible to assemble the flapper valve 18 or 20 inverted.

The preferred flapper valve 18 or 20 is of, for example, Sandvik #7 C27M02 stainless Swedish flapper valve steel; U.H.B. Stainless 716, modified type 420 stainless spring steel; or Hitachi GIN-6 hardened stainless flapper valve strip steel. The flapper valve is, for example, 0.004 inch thick, and the slots 54 are offset by approximately 0.05 inch from the center line of the valve.

As is shown in FIG. 6, the restraint 44 or 46 has a recess 56 into which the head of the screw 50b fits so that the screw 50b does not extend above the upper surface 16b of the valve plate 16 or above the upper surface of the valve restraint 46. The same configuration is provided for the inlet valve 20 so that the head of the screw 50a is below the lower surface 16a of the valve plate 16. The guides 58 and 60 are visible extending only part way to the surface of the valve plate 16 in the slots 52a and 52b.

FIG. 7 shows a sectional view of the outlet restraint 46 and the outlet valve 18 within the recess 51b defined by recess walls 62a and 62b. The recess 51b permits mounting of the flapper valve 18 and the valve restraint 46 so that neither extend above the surface of the valve plate 16. The recess walls 62a and 62b are spaced from the edges of the flapper valve 18 and the restraint 46 to permit air to pass therebetween when the flapper valve 18 is open as shown in solid outline. Ordinarily, however, the curved flapper valve 18 is biased against the lip 53, as shown in phantom. Like FIG. 6, screw 56 is recessed in the restraint 46 such that the head of the screw 56 is below the upper surface 16b of the valve plate 16.

Thus, there is shown and described a valve plate assembly 16 which restrains the flapper valve 18 from striking the piston, does not require a recess in top of the piston for the valve screw, and can only be assembled with the flapper valve 18 in the proper orientation. Since the inlet valve is recessed, there is no need for a particular orientation relative to clearances on the piston head, so that assembly of the valve plate 16 on the cylinder 28 in any orientation is possible. Since the outlet valve is also recessed, there is room in the manifold 22 for sound reducing material or baffles without interfering with valve movement.

Although other modifications and changes may be suggested by those skilled in the art, it is the intention of the inventor to embody within the patent warranted hereon all changes and modifications as reasonably and properly come within the scope of his contribution to the art.

I claim:

1. A flapper valve assembly for intake and outlet holes to a chamber of a compressor, said valve assembly comprising:
   a valve plate forming a wall of said chamber and having said intake and outlet holes therethrough, said valve plate having a plurality of recessed portions with a plurality of guides at fixed locations and an aperture wherein at least one recessed portion is on an interior wall facing said chamber and another of said plurality of recessed portions is on an external wall facing away from said chamber;
   a plurality of resilient members wherein a single member overlays each of said plurality of guided recessed portions, each of said plurality of members having an aperture aligned with said aperture of said valve plate and notched sections corresponding to said fixed locations of said plurality of guides;
   a plurality of restraints overlying each of said plurality of resilient members, each of said restraints having a recessed aperture corresponding to said aperture of each of said resilient members wherein each of said restraints further include notched sections corresponding to said fixed locations of said plurality of guides; and
   a fastener having a head extending through said aligned apertures.

2. The assembly of claim 1 wherein said notched sections and said guides are equidistantly and oppositely displaced from a centerline through said apertures.

3. The assembly of claim 1 wherein each of said recessed apertures of said restraints allows said head of said fastener to secure at or below said corresponding interior or exterior wall.

4. The assembly of claim 1 wherein each of said restraints is made of a rigid material thereby limiting motion of each of said resilient members.

5. The assembly of claim 1 wherein each of said plurality of members has an inherent curved surface facing said recessed portion.

6. A method of assembling a flapper valve assembly for intake and outlet holes to a chamber of a compressor comprising the steps of:
   providing a valve plate with a plurality of recesses, a plurality of guides at fixed locations, and an aperture;
   inserting a resilient member overlying each of said plurality of guided recesses, said resilient member having notched sections corresponding to said fixed locations of said plurality of guides and an aperture aligned with said aperture of said valve plate;
   inserting a restraint overlying each resilient member, said restraint having notched sections corresponding to said fixed locations of said plurality of guides and an aperture aligned with said aperture of said valve plate; and
   extending a fastener having a head through each of said aligned apertures.

7. The method of claim 6 further comprising the step of:
   displacing said guides and said notched sections equidistantly and oppositely from a centerline through said respective apertures.

8. The method of claim 6 further comprising the step of:
   securing said head of said fastener at or below a corresponding wall of said valve through which said fastener extends.

9. A flapper valve assembly comprising:
   a valve plate having at least one recessed portion with a plurality of non-aligned guides within opposite sidewalls of each of said at least one recessed portion;
   a resilient member substantially covering each of said at least one recessed portion and having a plurality of notched sections corresponding to said plurality of guides for slidably inserting onto said plurality of guides; and
   a restraint having a plurality of notched sections corresponding to said plurality of guides wherein said restraint overlays said member.

10. The assembly of claim 9 further comprising:
    a fastener having a head extending through aligned apertures of said valve plate, said member and said restraint.

11. The assembly of claim 10 wherein said heat of said fastener is secured at or below an exterior or interior wall of said valve plate.

12. The assembly of claim 9 wherein said resilient member has an inherently curved surface facing said recessed portion.

13. The assembly of claim 9 wherein said restraint is a rigid material which limits resiliency of said member.

* * * * *